No. 861,236. PATENTED JULY 23, 1907.
A. L. MOEN.
SCRAPER FOR DISK HARROWS.
APPLICATION FILED NOV. 26, 1906.

Witnesses.
P. C. Dahlberg.
J. B. Smutney.

Inventor.
A. L. Moen
by Quirq & Lane atty's

UNITED STATES PATENT OFFICE.

ANDREW L. MOEN, OF FOREST CITY, IOWA.

SCRAPER FOR DISK HARROWS.

No. 861,236.  Specification of Letters Patent.  Patented July 23, 1907.

Application filed November 26, 1906. Serial No. 345,036.

*To all whom it may concern:*

Be it known that I, ANDREW L. MOEN, a citizen of the United States, residing at Forest City, in the county of Winnebago and State of Iowa, have invented a certain new and useful Scraper for Disk Harrows, of which the following is a specification.

The object of my invention is to provide a scraper for disk harrows having a scraper blade for each disk and so arranged that when the scraper blades are in one position, they will be yieldingly held by a spring against the disks and when in another position will be supported by the spring at points above the disks, and further to provide means whereby the scrapers may be manually set from either position to the other.
A further object is to provide an improved scraper blade and means for attaching it to the supporting bar.

My invention consists in the construction, arrangement and combination of the various parts of the device, whereby the objects contemplated are attained, as hereinafter more fully set forth, pointed out in my claims and illustrated in the accompanying drawings, in which—

Figure 1:
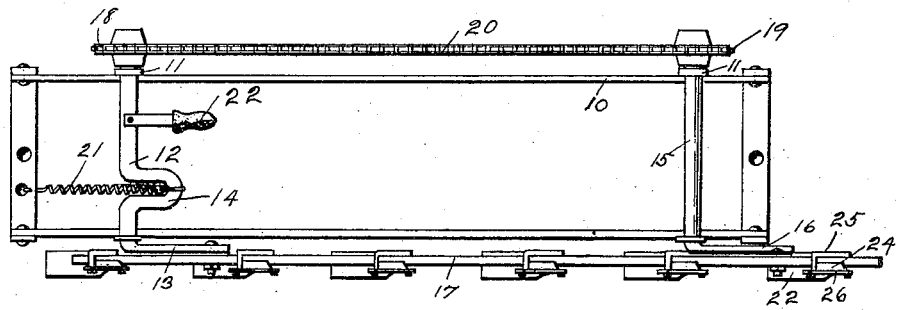
Figure 2:
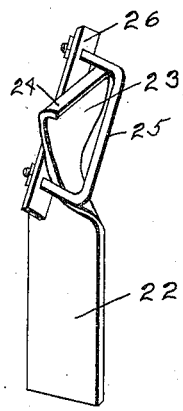
Figure 3:
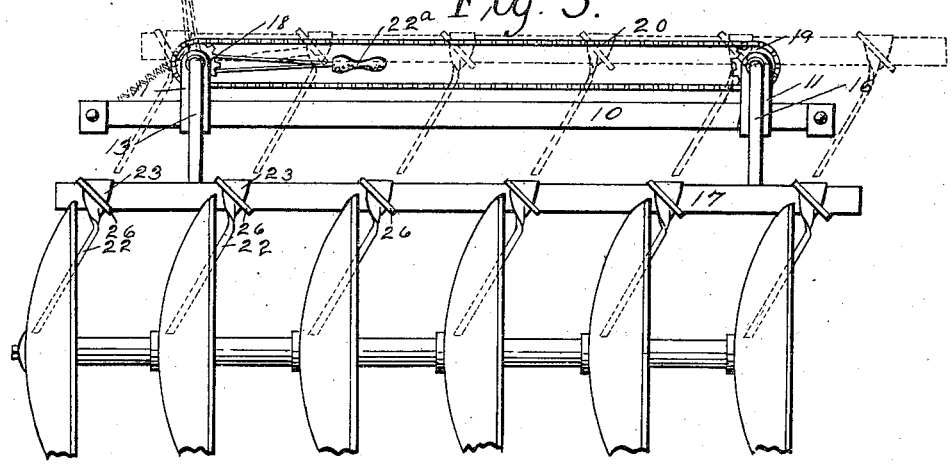

Figure 1 shows a perspective view of a device embodying my invention. Fig. 2 shows a perspective view of one of the scraper blades detached. Fig. 3 shows a rear end elevation of a series of disks in position adjacent to the scraper blades. The dotted lines in said figure show the scraper blades in their elevated position.
Referring to the accompanying drawings, I have used the reference numeral 10 to indicate the supporting frame of the device. This frame is designed to be secured to the frame of a disk harrow. Mounted upon the sides of the frame are two pairs of bearings
11. In one pair of said bearings I have mounted a shaft 12 having on its rear end a crank arm 13 and near its central portion a crank arm 14. On the shaft 15 there is a crank arm 16 similar to the crank arm 13. The scraper blade supporting bar is indicated by the numeral 17 and is pivotally connected with the crank arms 13 and 16. Fixed to the forward ends of the shafts 12 and 15 are the sprocket wheels 18 and 19, which sprocket wheels are connected by the sprocket chain 20. Connected with the crank arm 14 is a contractible coil spring 21, the other end of which is attached to a frame 10 and fixed to the shaft 12 is a hand lever 22.

The scraper blades are detachably and adjustably mounted on the bar 17 and each is formed complete of a single piece of metal twisted near its central portion and having at its lower end a flat blade 22 which extends upwardly and laterally. The upper portion of each blade extends at right angles to the lower portion and comprises a flat portion 23 to lie against the rear face of the bar 17 and a top edge 24 to project over the top of the bar 17. I connect these blades with the part 17 by means of a substantially U-shaped bolt 25 with its ends screw threaded and extended through a plate 26, nuts 27 being provided on the ends of the bolt 25 to engage the plate 26. I arrange the bolt 25 against the forward face of the bar 17 with one end extended over the bar and to the right of the scraper plate and the other end extended under the bar to the left of the scraper plate. Then the plate 26 is placed on the ends of the bolt and in engagement with the flat portion 23 of the plate and finally the nuts are placed in position and screwed tight. In this way a scraper blade of simple, durable and inexpensive construction is provided and it may be quickly and easily adjusted relative to the bar 17 and firmly held in any position of its adjustment.

In practical use and assuming the parts to be in the position shown in Fig. 2, it is obvious that the scraper blades are yieldingly held by the spring 21 against the disks and when so held perform the ordinary function of scraper blades of this class. If it is desired to throw them to a position that will be inoperative, the operator grasps the lever 22 and moves it upwardly until the crank arm 14 passes above a point in line with the spring 21, whereupon the spring will operate to hold the shaft 12 in position with the arm 13 extended upwardly above a horizontal line. The sprocket gearing provides for moving the shaft 15 in unison with the shaft 12 so that both ends of the scraper blade supporting bar will be raised or lowered in unison. It is obvious that the bar 17 would of itself serve to move the crank arm 16 to a substantially horizontal position when the crank arm 13 is so moved by the lever 22, but in order to cause the crank arm 16 to move above a horizontal line, a sprocket gearing device or its equivalent is essential.

Having thus described my invention, what I claim and desire to secure by Letters Patent of the United States, therefor is—

1. A scraper for disk harrows, comprising two crank shafts, a scraper blade supporting bar pivoted to the crank shafts, a series of scraper blades on said bar, a lever connected with one of said crank shafts and means for gearing the crank shafts together.

2. In a scraper for disk harrows, the combination of a frame, two crank shafts mounted in the frame, a scraper blade supporting bar pivoted to the crank shafts, scraper blades thereon and a spring connected with one of the crank shafts for yieldingly holding the scraper blades in a direction toward the disks of a harrow.

3. In a scraper for disk harrows, the combination of a frame, two crank shafts mounted in the frame, a scraper blade supporting bar pivoted to the crank shafts, scraper blades thereon, a spring connected with one of the crank shafts and arranged to yieldingly hold the scraper blades toward the disks when in one position, said supporting bar and crank shafts being so arranged with relation to the spring that when the supporting bar is at its upper limit of movement, the spring will yieldingly hold it in said position and means for gearing the crank shafts together.

4. In a scraper for disk harrows, comprising a frame, two crank shafts mounted in the frame, each having a crank arm at its rear end and one having a crank arm at its center portion, a contractible spring fixed to the latter crank arm and to a part of the frame, sprocket wheels on the crank shafts, a chain connecting them, a lever fixed to one of the crank shafts, a bar pivotally connected with said crank arms.

5. A scraper blade formed of a single piece of metal twisted at its central portion and having at its lower end a blade inclined downwardly and laterally and at its upper end a flat portion extended transversely of the blade and having its top margin projected forwardly, a U-shaped bolt, a plate having the ends of the bolt passed through it and nuts for said bolt.

ANDREW L. MOEN.

Witnesses:
OLIVER GORDEN,
G. H. BELSHEIM.